United States Patent [19]

Shikata et al.

[11] 4,262,060
[45] Apr. 14, 1981

[54] SOLAR HEAT ABSORBER AND A METHOD OF MANUFACTURING THE SAME

[75] Inventors: Toshio Shikata, Yokohama; Shigetomo Ueda, Tokyo; Masakazu Inagaki, Koganei, all of Japan

[73] Assignee: Tokyo Shibaura Denki Kabushiki Kaisha, Tokyo, Japan

[21] Appl. No.: 90,106

[22] Filed: Nov. 1, 1979

[30] Foreign Application Priority Data

Nov. 9, 1978 [JP] Japan .............................. 53/138241

[51] Int. Cl.$^3$ .................. B32B 15/00; C25D 3/56
[52] U.S. Cl. .................. 428/640; 75/123 J; 75/134 B; 75/134 F; 75/170; 126/417; 126/901; 204/43 T; 428/668; 428/671; 428/675; 428/676; 428/680; 428/681
[58] Field of Search .............. 204/43 T, 43 S, 43 R; 428/671, 640, 675, 676, 677, 646, 647, 668, 680, 681; 126/417, 901; 75/123 J, 134 B, 134 F, 170, 175 R

[56] References Cited

U.S. PATENT DOCUMENTS

| | | | |
|---|---|---|---|
| 2,844,530 | 7/1958 | Wesley et al. | 204/43 T X |
| 3,772,168 | 11/1973 | Dillenberg | 204/43 S |
| 4,152,240 | 5/1979 | Kuo | 204/43 T X |
| 4,162,204 | 7/1979 | Kuo | 204/43 T X |

FOREIGN PATENT DOCUMENTS

1423592 2/1976 United Kingdom .................. 204/43 T

OTHER PUBLICATIONS

M. Sarojamma et al., Electroplating and Metal Finishing, pp. 51–54, Feb. 1965.
R. Sivakumar et al., Electroplating and Metal Finishing, pp. 14–27, Jan. 1971.
B. A. Shenoi et al., Metal Finishing, pp. 65–69, Oct. 1963.
Craig V. Bishop et al., AES Coatings for Solar Collectors Symposium, pp. 109–112, Nov. 1976.

*Primary Examiner*—G. L. Kaplan
*Attorney, Agent, or Firm*—Oblon, Fisher, Spivak, McClelland & Maier

[57] ABSTRACT

A solar heat absorber is produced by electrodepositing on a metallic substrate acting as a cathode in a plating bath a black coating including a ternary alloy represented by the formula:

$$Sn-M-Mo$$

where M is Fe, Co or Ni. The electroplating bath contains a stannous salt, a salt of a metal M selected from the group consisting of cobalt, nickel and iron, a molybdate, an alkali metal pyrophosphate, and an amino acid or an ammonium salt of carboxlyic acid or mineral acid.

30 Claims, No Drawings

SOLAR HEAT ABSORBER AND A METHOD OF MANUFACTURING THE SAME

This invention relates to a solar heat absorber and a method of manufacturing the same, and more particularly to a solar heat absorber provided with an electroplated black alloy coating and a method of manufacturing the same.

In recent years, greater attention is being paid to the technique of utilizing solar energy in place of the energy of petroleum or atomic power. The solar energy reaching the earth has a low density. Such solar energy has such density characteristic that a peak appears at a wavelength of 0.5 micron, and about 98% of the entire solar energy is distributed over a wavelength range below 2 microns. For the effective utilization of solar energy, therefore, it is preferred to provide a surface having such solar heat selectively absorbing characteristic that it can absorb the solar energy distributed over the above-mentioned wavelength range to a maximum extent and is least likely to let escape the absorbed energy by re-radiation.

Solar heat selectively absorbing materials or solar heat absorbers known to date include the surface electroplated with a black chromium coating and that electroplated with a black nickel coating. The black chromium coating has such excellent solar heat selectively absorbing characteristics that the solar heat-absorptance α ranges between 0.84 and 0.95 and the infrared emittance ε ranges between 0.01 and 0.10. Further advantage of the black chromium coating is that even when exposed to heating or atmospheric conditions, it little changes in the absorptance property and its external appearance. Nevertheless, the chromium coating has the drawback that the formation of it is carried out by applying a plating bath containing as high a concentration as 200 to 300 g/l of chromic anhydride, thus making it necessary to provide expensive accessary equipment such as a waste water-treating device or exhaust treating arrangement in order to prevent environmental pollutions. Further disadvantages of the chromium coating are that the electroplating of the coating has to be effected by applying power having as high a current density as 20 A/dm² or more and current efficiency of the plating is very low and thus the plating is restricted by low energy efficiency. In addition the chromium coating has an unsatisfactory throwing power, presenting difficulties in providing an electroplated coating having a uniform thickness.

In contrast, the electroplated black nickel coating is free from the above-mentioned drawbacks accompanying the black chromium coating, and moreover has such prominent solar heat selectively absorbing characteristics that the solar heat absorptance α indicates 0.84 to 0.95 and the infrared emittance ε stands at 0.01 to 0.07.

However, the nickel coating still has the fatal drawbacks that, where exposed to atmospheric conditions, even for a short period of time, the coating is quickly discolored from black to dark brown with the resultant deterioration of its property.

It is accordingly the object of this invention to provide a solar heat absorber which has solar heat selectively absorbing characteristics the same as or higher than those of the prior art black chromium coating or black nickel coating and higher weatherability or weather-resisting property, can be made with a lower current density, and is saved from the risk of environmental pollution.

To attain the above-mentioned object, this invention provides a solar heat absorber comprising:
a metallic substrate; and
a black film electrodeposited on said substrate and including a ternary alloy represented by the formula:

$$Sn-M-Mo$$

where M is Fe, Co or Ni.

A solar heat absorber according to this invention can be easily prepared by immersing an anode and a metallic substrate acting as a cathode in an electroplating bath comprising a stannous salt, a salt of cobalt, nickel or iron, a molybdate, an alkali metal pyrophosphate, and an amino acid or an ammonium salt of a carboxylic acid or mineral acid; and introducing current through said anode and metallic substrate, thereby electrodepositing the black film on said substrate.

There will now be detailed the above-mentioned electroplating bath and the conditions in which the solar heat absorber of the invention is produced.

STANNOUS SALT

A stannous salt helps to elevate the weatherability or weather-resisting property of a black ternary alloy coating formed by electrodeposition from the solution containing said stannous salt and two other metal ions. Desirably, the content of the stannous salt in the electroplating bath is 10 to 40 g/l. If the content of the stannous salt is smaller than 10 g/l, then the stannous salt does not contribute to the improvement of the weatherability of the resultant electroplated coating. Conversely where the content of the stannous salt exceeds 40 g/l, then the resultant electroplated coating is likely to decrease in mechanical strength. The content of the stannous salt is preferred to range from 16 to 35 g/l. The stannous salt includes stannous pyrophosphate, stannous chloride and stannous sulfate.

SALT OF COBALT, NICKEL OR IRON

A salt of the metal M contributes to the improvement of the mechanical strength of a black ternary alloy coating formed by electrodeposition from the salt of the metal M and two other metal ions. The content of the salt of the metal M in the electroplating bath generally ranges between 5 and 40 g/l. If the content of the salt of the metal M falls below 5 g/l, then the salt does not help to increase the mechanical strength of the resultant electroplated coating. Conversely, where the content of the salt of the metal M exceeds 40 g/l, then an alloying balance will be lost between the salt of the metal M and the two other metal ions. The content of the salt of the metal M is preferred to range from 15 to 30 g/l.

Salts of cobalt include cobalt chloride, cobalt sulfate, cobalt pyrophosphate, cobalt nitrate, cobalt carbonate, cobalt acetate and cobalt hydroxide. Salts of nickel include nickel chloride, nickel sulfate, nickel pyrophosphate, nickel nitrate, nickel carbonate, nickel acetate and nickel hydroxide. Salts of iron include iron chloride, iron sulfate, iron pyrophosphate, iron nitrate, iron carbonate, iron acetate and iron hydroxide.

MOLYBDATE

A salt of molybdic acid (molybdate) assists in blackening a solar heat absorbing ternary alloy coating formed by electrodeposition from the molybdate and two other metal ions. The content of the molybdate in the electroplating bath is generally between 10 and 150 g/l. If the content of the molybdate is smaller than 10 g/l, then the resultant ternary alloy coating can not be fully blackened, leading to a decline in the property of selectively absorbing the solar heat. Conversely where the content of the molybdate exceeds 150 g/l, then an alloying balance will be lost between the molybdate and two other metal ions. The content of the molybdate is preferred to range from 20 to 120 g/l. The molybdate include ammonium molybdate and sodium molybdate.

ALKALI METAL PYROPHOSPHATE

An alkali metal pyrophosphate forms stable complexes with a large number of metals and helps to ensure the stability of a plating bath, uniform electrodeposition and high current efficiency. The content of the alkali metal pyrophosphate in the plating bath generally ranges between 150 and 250 g/l, preferably between 180 and 220 g/l. The alkali metal pyrophosphate includes potassium pyrophosphate and sodium pyrophosphate.

AMINO ACID, OR AMMONIUM SALT

Amino acid, or ammonium salt acts as a co-depositing agent. The content of this agent in the plating bath is chosen to be 5 to 30 g/l, preferably 10 to 25 g/l.

Amino acids used in this invention include glycine, alanine, valine, leucine, norleucine, isoleucine, serine, threonine, cysteine, cystine, tyrosine and arginine.

Ammonium salts used in this invention include salts of carboxylic acid such as ammonium acetate, ammonium citrate and ammonium tartrate, and ammonium salts of mineral acid such as ammonium chloride and ammonium sulfate.

It is possible to add 1 to 10 g/l, preferably 3 to 7 g/l of an additive such as peptone or gelatin to a plating bath having the above-mentioned composition. This additive helps a plated film to be deposited with greater uniformity of thickness.

A solar heat absorber according to this invention is formed by electroplating a metallic substrate used as a cathode in the aforesaid plating bath. This electroplating operation should preferably be carried out under the following conditions:

| | |
|---|---|
| pH of electroplating bath | 8.5 to 10 |
| bath temperature | 40° to 70° C. |
| current density | 10 to 500, preferably 50 to 300 mA/dm² |
| time of electroplating | 0.5 to 30, preferably 1 to 20 minutes |

It is desirable to mechanically stir the plating bath during the electroplating operation by, for example, a cathode rocker.

The metallic substrate may be selected from a variety of metal plates such as those of copper, stainless steel, iron and aluminium. Particularly useful is a plate of copper having a high heat transfer efficiency.

AES analysis shows that a black ternary alloy coating electrodeposited on the metallic substrate is composed of:

| | |
|---|---|
| Sn | 15 to 40 atomic % |
| M | 45 to 60 atomic % |
| Mo | 3 to 20 atomic % |

Since 6 to 25 atomic % of oxygen is found in the plated film, Mo is supposed to be present therein in the form of an oxide. The most preferred composition of the plated film is as follows:

| | |
|---|---|
| Sn | 20 ± 5 atomic % |
| M | 50 ± 5 atomic % |
| Mo | 10 ± 5 atomic % |
| O | 20 ± 5 atomic % |

If formed with a thickness ranging between 0.1 and 0.5 micron, an electroplated black ternary alloy coating embodying this invention can fully display its characteristics. Generally, this alloy coating has a solar heat absorptance $\alpha$ ranging from 0.86 to 0.95 and an infrared emittance $\epsilon$ ranging from 0.20 to 0.03.

This invention will be more fully understood from the following examples.

EXAMPLES 1-5

Five different solar heat selectively absorbing black ternary alloy coatings were electrodeposited on a metallic substrate in plating baths having the corresponding five different compositions under the plating conditions given in the following Table 1, which also sets forth the solar heat absorptance $\alpha$ and infrared emittance $\epsilon$ of the respective electroplated coatings. The solar heat absorptance $\alpha$ of the respective electroplated coatings was obtained by comparing the actual solar energy (AMO) with the measured amount of energy reflected from an spectrophotometer at wavelengths of 0.4 to 2.5 microns. The infrared emittance $\epsilon$ of the respective electroplated coatings was determined by comparison between the measured amount of energy reflected from an infrared spectrophotometer at wavelengths of 2.5 to 30 microns and the amounts of energy emitted from a black body at 90° C.

TABLE 1

| Composition of plating bath (g/l) | Example 1 Sn-Co-Mo Alloy coating | Example 2 Sn-Co-Mo Alloy coating | Example 3 Sn-Ni-Mo Alloy coating | Example 4 Sn-Ni-Mo Alloy coating | Example 5 Sn-Fe-Mo Alloy coating |
|---|---|---|---|---|---|
| Potassium pyrophosphate | 200 | 200 | 190 | 200 | 200 |
| Glycine | 20 | 20 | — | 20 | 20 |
| Ammonium citrate | — | — | 10 | — | — |
| Stannous pyrophosphate | 35 | 35 | 30 | 25 | 20 |
| Cobalt chloride | 20 | — | — | — | — |
| Cobalt sulfate | — | 20 | — | — | — |
| Nickel chloride | — | — | 30 | — | — |
| Nickel sulfate | — | — | — | 25 | — |
| Ferric chloride | — | — | — | — | 15 |
| Ammonium molybdate | 20 | — | 60 | — | — |

TABLE 1-continued

|  |  | 1 | 2 | 3 | 4 | 5 |
|---|---|---|---|---|---|---|
| Sodium molybdate | | — | 30 | — | 100 | 30 |
| Peptone | | 3 | 5 | — | 5 | 5 |
| Gelatin | | — | — | 3 | — | — |
| | pH | 8.7 | 8.7 | 8.7 | 9.0 | 9.0 |
| Electroplating conditions | Current density (mA/dm$^2$) | 30 | 10 | 140 | 100 | 50 |
| | Time (minutes) | 10 | 10 | 1 | 2 | 5 |
| | Bath temperature (°C.) | 50 | 50 | 50 | 40 | 55 |
| | Anode | Stainless steel | Stainless steel | Stainless steel | Carbon board | Carbon board |
| | Cathode (metallic substrate) | Copper plate | Copper plate | Copper plate | Copper plate | Copper plate |
| Electroplated coating characteristics | Solar heat absorptance ($\alpha$) | 0.91 | 0.93 | 0.87 | 0.93 | 0.85 |
| | Infrared emittance ($\epsilon$) | 0.05 | 0.02 | 0.02 | 0.05 | 0.1 |
| Composition of electroplated coating (atomic %) | | Sn 25<br>Co 60<br>Mo 5<br>O 10 | Sn 25<br>Co 60<br>Mo 5<br>O 10 | Sn 25<br>Ni 60<br>Mo 5<br>O 10 | Sn 20<br>Ni 50<br>Mo 10<br>O 25 | Sn 25<br>Fe 60<br>Mo 5<br>O 10 |

Where solar heat selectively absorbing materials formed of copper plates on which black ternary alloy films of Examples 1-5 were electrodeposited were exposed to the atmosphere for one year, the plated films were not discolored, nor decreased in the efficiency of selectively absorbing solar heat, thus proving to have prominent weatherability or weather-resisting property.

As apparent from the foregoing description, this invention has the following advantages:

(1) It is possible to produce an electroplated black alloy coating having a solar heat selectively absorbing property the same as or higher than that of the prior art black chromium electroplated coating or black nickel electroplated coating.

(2) It is possible to produce an electroplated black alloy coating of very high weatherability which is not discolored during exposure to the atmosphere even for a long period of time.

(3) Since the subject electroplated black alloy coating is produced with as low a current density as 10 to 500 mA/dm$^2$, plating electric energy can be noticeably saved.

(4) The subject black electroplated alloy coating is produced without using any amount of chromic acid which often gives rise to environmental pollutions, thus reducing the duty of treating waste water or exhaust gas and consequently improving an operation environment.

What we claim is:

1. A solar heat absorber comprising:
a metallic substrate; and
a black coating electrodeposited on said substrate and including a ternary alloy represented by the formula:

Sn—M—Mo where M is Fe, Co or Ni; and wherein the coating contains 15 to 40 atomic % of Sn, 45 to 60 atomic % of M, 3 to 20 atomic % of Mo and 6 to 25 atomic % of oxygen.

2. The absorber according to claim 1, wherein Mo is present in the coating in the form of an oxide.

3. The absorber according to claim 2, wherein M is Fe.

4. The absorber according to claim 2, wherein M is Co.

5. The absorber according to claim 2, wherein M is Ni.

6. The absorber according to claim 1, wherein the metallic substrate is formed of copper.

7. The absorber according to claim 1, 2, 6, 3, 4 or 5, wherein the coating has a thickness ranging from about 0.1 to about 0.5 microns.

8. The absorber according to claim 1, wherein the coating contains 15 to 25 atomic % of Sn, 45 to 55 atomic % of M, 5 to 15 atomic % of Mo, and 15 to 25 atomic % of oxygen.

9. The absorber according to claim 1, wherein the coating has a solar heat absorptance $\alpha$ of 0.86 to 0.95, and an infrared emittance $\epsilon$ of 0.20 to 0.03.

10. A method of manufacturing a solar heat absorber, comprising:
immersing an anode and a metallic substrate as a cathode in an aqueous electroplating bath containing a stannous salt, a salt of a metal M selected from the group consisting of cobalt, nickel and iron, a molybdate, an alkali-metal pyrophosphate, an amino acid or an ammonium salt of carboxylic acid or mineral acid; and
electrodepositing on the metallic substrate a black coating including a ternary alloy represented by the formula:

Sn—M—Mo where M is Fe, Co or Ni and the electroplating bath contains 10 to 40 g/l of the stannous salt, 5 to 40 g/l of the salt of a metal M, 10 to 150 g/l of the molybdate, 150 to 250 g/l of the alkali metal pyrophosphate and 5 to 30 g/l of the amino acid or the ammonium salt of a carboxylic acid or mineral acid, and wherein the bath has a pH of 8.5 to 10, the bath is maintained at a temperature of 40° to 70° C., and the electrodeposition is carried out with a current density of 10 to 500 mA/dm$^2$.

11. The method according to claim 10, wherein the electroplating bath contains 1 to 10 g/l of peptone or gelatin.

12. The method according to claim 10, comprising stirring the plating bath during the electrodeposition.

13. The method according to claim 10, wherein the metallic substrate is formed of copper.

14. The method according to claim 10, wherein the bath contains the stannous salt in an amount of 16 to 35 g/l.

15. The method according to claim 10 or 14, wherein the stannous salt is stannous pyrophosphate, stannous chloride or stannous sulfate.

16. The method according to claim 10, wherein the bath contains the salt of the metal M in an amount of 15 to 30 g/l.

17. The method according to claim 10 or 16, wherein the salt of the metal M is an iron salt.

18. The method according to claim 17, wherein the iron salt is iron chloride, iron sulfate, iron pyrophosphate, iron nitrate, iron carbonate, iron acetate or iron hydroxide.

19. The method according to claim 10 or 16, wherein the salt of the metal M is a cobalt salt.

20. The method according to claim 19, wherein the cobalt salt is cobalt chloride, cobalt sulfate, cobalt pyrophosphate, cobalt nitrate, cobalt carbonate, cobalt acetate or cobalt hydroxide.

21. The method according to claim 10 or 16, wherein the salt of the metal M is a nickel salt.

22. The method according to claim 21, wherein the nickel salt is nickel chloride, nickel sulfate, nickel pyrophosphate, nickel nitrate, nickel carbonate, nickel acetate or nickel hydroxide.

23. The method according to claim 10, wherein the bath contains the molybdate in an amount of 20 to 120 g/l.

24. The method according to claim 10 or 23, wherein the molybdate is ammonium molybdate or sodium molybdate.

25. The method according to claim 10, wherein the bath contains the alkali metal pyrophosphate in an amount of 180 to 220 g/l.

26. The method according to claim 10 or 25, wherein the alkali metal pyrophosphate is potassium pyrophosphate or sodium pyrophosphate.

27. The method according to claim 10, wherein the bath contains the amino acid or the ammonium salt in an amount of 10 to 25 g/l.

28. The method according to claim 10 or 27, wherein the amino acid is glycine, alanine, valine, leucine, norleucine, isoleucine, serine, threonine, cysteine, cystine, tyrosine or arginine.

29. The method according to claim 10 or 27, wherein the ammonium salt is ammonium acetate, ammonium citrate, ammonium tartrate, ammonium chloride or ammonium sulfate.

30. The method according to claim 10, wherein the electrodeposition is carried out at a current density of 50 to 300 $mA/dm^2$.

* * * * *